United States Patent [19]

Schrader et al.

[11] Patent Number: 5,903,881
[45] Date of Patent: May 11, 1999

[54] PERSONAL ONLINE BANKING WITH INTEGRATED ONLINE STATEMENT AND CHECKBOOK USER INTERFACE

[75] Inventors: Joseph A. Schrader, Los Altos; Patanjali Bhatt, Santa Clara; Charles A. Altekruse, Atherton, all of Calif.

[73] Assignee: Intuit, Inc., Mountain View, Calif.

[21] Appl. No.: 08/869,580

[22] Filed: Jun. 5, 1997

[51] Int. Cl.⁶ .............................. G06F 17/60; G06F 19/00
[52] U.S. Cl. .............................. 705/42; 235/379; 902/24; 902/26
[58] Field of Search ........................ 705/42, 18; 235/379; 902/26, 24

[56] References Cited

U.S. PATENT DOCUMENTS

| | | | |
|---|---|---|---|
| 4,346,442 | 8/1982 | Musmanno | 364/408 |
| 4,737,911 | 4/1988 | Freeman, Jr. | 364/406 |
| 5,134,564 | 7/1992 | Dunn et al. | 364/406 |
| 5,221,838 | 6/1993 | Gutman et al. | 235/379 |
| 5,233,547 | 8/1993 | Kapp et al. | 364/705.02 |
| 5,471,575 | 11/1995 | Giansante | 395/144 |

OTHER PUBLICATIONS

Intuit, "Quicken 6 for Windows User's Guide" Chapter 3 pp. 11–22, Chapter 5, pp. 27–46, 1996.

"Making the Most of Microsoft Money", pp. 1–3, 30–40, and 42–49, Microsoft Corporation 1996.

"Quicken User's Guide, Version 5 for Windows", Chapter 5, pp. 27–50, Chapter 9, pp. 89–99, Intuit Inc. 1995.

"Quicken User's Guide, Version 6 for Macintosh", Chapter 4, pp. 23–26, Chapter 19, pp. 281–294, p. 344, Intuit Inc. 1995.

*Primary Examiner*—Allen R. MacDonald
*Assistant Examiner*—Penny Caudle
*Attorney, Agent, or Firm*—Fenwick & West LLP

[57] ABSTRACT

A software product, computer implemented method, and system provide an integrated user interface having three simultaneously displayed items of information, including a list of transaction instructions, a list of uncleared transactions, and a list of cleared transactions. The simultaneous display, and interaction between the lists, provides for integration of various tasks separately associated with personal finance software products and with online banking products. Two account balances are also simultaneously displayed, a balance for cleared transactions, and a separate balance based on both cleared and uncleared transactions. The two balances provide the user with a complete view of the status of their account and available funds. The software product and system supports online bill payment, electronic funds transfer, and checkbook transactions, without requiring navigation through multiple, separate user interfaces for different modules of the product.

11 Claims, 15 Drawing Sheets

FIG. 7

PERSONAL ONLINE BANKING WITH INTEGRATED ONLINE STATEMENT AND CHECKBOOK USER INTERFACE

BACKGROUND

1. Field of Invention

The present invention relates to systems, methods, and software products for online banking, and more particularly, to systems, methods, and software products for online banking that integrates end user checkbook activities directly with bank statement transactions.

2. Background of Invention

Online banking systems have been repeatedly promised, but rarely delivered in recent years. A lengthy summary of some of the problems the banking industry has faced in delivering online banking is found in Lawlor et al., U.S. Pat. No. 5,220,501.

One of the key issues in delivering online banking is ease of use. Ease of use is predicated on many factors, including the ability of the user to identify the banking information of interest and execute desired banking tasks without error or difficulty. Generally, users perform four main tasks in checkbook and online banking applications:

Account Management—This activity includes viewing bank account data from the bank, such as cleared transactions and account balances, initiating requests to bank to generate fund transfers between accounts, and supporting tasks such as requesting information from the bank on certain accounts or transactions.

Bill payment—Initiating requests to the bank to pay a vendor a certain amount by a certain date. Related tasks such as making payment inquiries may also be performed.

Checkbook transactions—Accounting for checks, withdrawals, debit card purchases, and the like, that the user does on a regular basis. These transactions must be accounted for and integrated with the account data from the bank for an accurate reflection of the user's account.

Current balance calculation—Determining how much money the user really has available in their account, based on cleared and uncleared transactions (including other checkbook transactions). The current balance is calculated, typically by the user or sometimes by the application, by taking the latest account balance given by the bank and adding/subtracting any uncleared transactions in the user's own checkbook.

Extensive consumer and usability research indicates two key areas of usability concerns with these various tasks. First, customers view banking, bill payment and the determination of their current balance as interrelated tasks. Accordingly, they want related banking task and banking information to operate together in an online banking product. In fact banking tasks, such as obtaining balance information, cleared transactions, and so forth, are often used to provide information to support the bill payment tasks.

Second, customers have difficulty using an online banking system when it is necessary to navigate from one user interface to another user interface in order to complete some task. Navigation difficulties increase both the time required by the user to complete the task, and the likelihood of error in completing the task.

An example of a typical user task makes clear the need for integration of banking tasks and banking information. A typical scenario is payment of bills, which may include a large credit card bill. The user will typically decide how much of the credit card bill to pay based on currently available funds, taking into account cleared transactions, and uncleared transactions, such as other bills being paid. To complete this task with an online banking software product, the user needs to perform the following steps:

Determine current balance in the account based for cleared transactions.

Review in the checkbook to determine actual current balance, based on the uncleared transactions, and cleared balance.

Determine if they need to transfer money from another account to pay the bills.

Enter the bill payment requests including, calculating how much of the credit card to pay from the actual balance.

Use the requests to pay the bills.

Send the request to transfer funds.

From the user's perspective, this banking activity is clearly an integrated one, since the user must integrate three tasks—writing checks to pay other bills, obtaining cleared transactions and current balance from the bank, and determining a combined current balance based on this information—before writing the credit card bill. Accordingly, there is a need to provide an online banking software product and system that supports the integration of these tasks and their underlying information components.

There have been various approaches, as summarized in Lawlor et al., to making online banking easy for consumers to use for bill payment and checkbook maintenance. These approaches fall mainly into two categories, typically tightly associated with the type of company that is delivering the online banking software and system. Generally, there are personal finance products from personal finance software companies, and banking products from banks and other financial institutions. Products in both of these categories are generally deficient at integrating banking tasks and banking information in support of user's actual needs.

First, online banking software products from personal finance software companies are typically "checkbook-centric." Most personal finance software products employ the checkbook as the underlying user model. As a result, all transactions, such as paying bills, writing checking, depositing or transferring funds, are done through a checkbook-like user interface, even if the checkbook metaphor is not particularly appropriate for the task. For example, Quicken® 5.0, provides a checkbook metaphor for users. In FIG. 1, there is shown a user interface 100 of the main entry screen for a personal finance software product. The entry screen has a number of icons that are invoked to perform different functions, such as the checkbook register 101, online banking 103, and online bill payment 105. FIG. 2 illustrates the user interface for the checkbook register 107.

Prior to the availability of online banking, the user would enter all of their various transactions into the checkbook register 107, and then manually reconcile the checkbook register 107 against a printed bank statement. In the checkbook register type user interface the user sees all of their transactions, including both cleared and uncleared transactions mixed together. This is seen in FIG. 2, where the first transaction is indicated as cleared (the "R" in the column labeled "Clr"), and the other transactions are not cleared. Further, the balance 109 here is of all transactions that have been entered by the user, whether cleared or not. The user has no separate balance information for just the cleared transactions immediately available, which as noted above, was the first item of information the user typically needs during bill payment.

Once online banking became available, this type functionality was added as an additional feature in many checkbook products, to both automate reconciliation of uncleared transactions in the checkbook against the bank's own records of cleared transactions, and to provide electronic, online payment of bills. Typically, an online banking module is provided in which the user can view the bank's current account balance in a user interface display separate from the checkbook register 107. As shown in FIG. 1, there are separate icons for checkbook register 101 and the online banking module 103. Selecting the online banking icon for the online banking module 103 causes the display of the online banking user interface 111, as shown in FIG. 3. In this interface, the user only sees the cleared transactions which have been downloaded from the bank with the Get Online Data button 113. The balance 115 here is based only on the cleared transactions, the bank having no information about the user's recently entered, and uncleared, checkbook transactions.

To use the online information for bill payment, the user must download certain transactions to first reconcile their account. Once the transactions are downloaded, the checkbook register 107 merely reflects which transactions have cleared. The only difference that appears to the user is the indication in the checkbook register 107 of which transactions have been cleared. This is shown in FIG. 2 as the letter "R" in the "Clr" column. To use both sets of the data, the user would have to switch back and forth between the different user interfaces.

Electronic bill paying, which is often touted as a desirable feature of online banking systems, is typically enabled, but often as an extension of the user's checkbook. That is, bill payments are treated as checks, and entered in a separate user interface. FIG. 4 illustrates a typical example of an online bill payment interface 117. This interface 117, which is invoked from its own icon 105 in the main user interface 100, is completely separate from the user interfaces for the online banking module 111 or the checkbook 103. This separation of function hinders the integration of bill payment, account management, and checkbook tasks.

For these reasons, in these types of software products, there is no persistent view of the bank's online statement, as such. The online banking module, as illustrated, is essentially a staging area where the user views transactions before using them to reconcile their checkbook or pay bills. In this user model the checkbook is persistent and the online statement is temporary, since it is only viewed by downloading the information from the bank. Further, in checkbook-centric products, the balance that is visible throughout the software product is the ending balance based on the transactions in the user's checkbook, as shown in FIG. 2, including both cleared and uncleared transactions. The latest balance of cleared transactions from the bank is typically visible only within the separate user interface display for the online banking module and is not used anywhere else in the product.

The problem with this approach is that it assumes the primacy of the user's checkbook in the user model and system design, and demotes the fact that the bank's own records of the user's account are a necessary component for an overall accurate reflection of account activity. That is, while the bank's own records show that user's actual balance and cleared transactions, that information is never presented to the user in single user interface consolidated with the existing information in the checkbook. Rather, the information identifying cleared transactions is merely propagated into the user's checkbook, as shown in the "Clr" column in FIG. 2. Further, while bill payment is dependent on both the checkbook and online statement information, that activity and related information is presented in a completely separate user interface.

As a result of this user model and design, there is a lack of integration in the product of the actual tasks the user wants to perform. The software product separates checkbook functions, bill payment, and viewing/downloading transactions from the bank into discrete operations, with their own user interfaces. The user must perform four separate tasks, and navigate multiple user interface screens to achieve what they consider to be the single task of paying bills based on currently available funds.

In the second category of online banking systems are software products and systems provided by banks or their affiliates. Not surprisingly, these software products are "bank-statement centric" and take the bank's statement as the primary user model and interface. These software products typically display only transactions that have actually been cleared by the bank. An example of this type of user interface is shown in FIG. 5, which illustrates a portion of Wells Fargo's Online™ Banking web-site. In this account history screen (one of a number of user interfaces to be navigated, including an account summary screen, a fund transfer screen, and a download screen). Along with only showing cleared transactions, there is only provided the balance information for cleared transactions.

Because of this limitation, these products typically do not let the user incorporate transactions that have not been posted or cleared by the bank, for example, checks that the user has recently written, or withdrawals or deposits recently made but not posted, transactions which are a fundamental component of the user's overall account. Thus, the user does not get a complete view of the actual status of his account as the user considers it, but only the information about cleared transactions that the bank has. This information is insufficient to serve the user's needs since the actual amount of funds the user has available is based on both the cleared and uncleared transactions.

Another particular limitation of online banking systems such as Wells Fargo's is that they do not contain information fully identifying the cleared transactions. As shown in FIG. 5, there is no information identifying the payee for checks, debits, and point of sale transactions. This absence of information makes it difficult for the user to determine which transaction is associated with which payee, and thus which transactions have cleared. The user must correlate check numbers instead, which in some cases my be incorrectly recorded or even not recorded at all by the user, who instead may easily remember the payee. Identification of point of sale transactions is even harder, since only the date and amount are available from the financial institution. Thus these types of online systems make integration of the various banking information and tasks very difficult and time consuming.

Further, many of these bank-based software products are specifically intended to show merely the user's current cleared balance and the cleared transactions on which it is based. However, the user cannot typically see the impact of these activities on their accounts until they actually clear the bank. That is, the effect of transactions on the balance of the user's account is not reflected in the user interface of the product. The user also cannot typically enter into the online system other transactions such as hand-written checks or calculate a running balance based on both clear and uncleared transactions. To do these latter activities, the user typically needs to download the cleared transaction data from the online banking product and import it into another personal finance product. An example of this limitation is shown in FIG. 6, which is a view of another user interface screen of the Well Fargo Online™ Banking product. Here, the user can download cleared transactions into a specific file format. The user must then use a separate personal finance application or spreadsheet to actually integrate the cleared transaction data with their checkbook of uncleared transactions. This process is time-consuming and difficult for many users, and requires using two different software products, and understanding how to interrelate them.

As the foregoing discussion indicates, users of these various types of online banking products have to navigate between multiple different user interfaces to perform a single task. Usability research on users working with these types of products has shown that at each navigation step, there was high potential for error and confusion. Users are not always sure how information in one user interface screen is related to information in another screen, or when it is necessary to switch to another part of the product to proceed through a task.

The need for easy-to-use and efficient online banking software products and systems becomes even more pronounced when considering that different users have different needs, expectations, and abilities. Research has shown that there are two types of users of financial software products: Organizers and Transactors. Organizers specifically intend to use their financial software products to organize, categorize, and track their finances with precision and detailed accuracy. For these types of users, conventional software products that provide the ability to categorize transactions, produce complex reports of income and expenses, and the like are seen as useful tools.

In sharp contrast, Transactors mainly want to pay bills and avoid overdrafts of their accounts. Transactors are typically not interested in categorizing transactions, tracking all income and expenses, or obtaining complex reports and summaries. To date, conventional software products have been designed almost exclusively with Organizers as the intended users, and as such do not provide the types of information Transactors desire most. Specifically, because Transactors are concerned with avoiding overdrafts, existing products and systems that do not provide an integrated view of both cleared transactions from the bank and uncleared transactions in the user's account, along with a current balance, do not meet the Transactor's need for an easy-to-use financial software product.

In summary, existing software products and systems do not provide for an integration of all of the relevant information about a user's account—the checkbook of uncleared transactions, cleared transactions, pending bill payments, fund transfers, and other transactions—in a single user interface display. Accordingly, it is desirable to provide on an online banking software product and system that tightly integrates bill payment, account management, and determination of current balances, into a single user interface display.

SUMMARY OF THE INVENTION

In accordance with one aspect of the present invention, there is provided a system, method, and financial software product that integrates the key banking tasks and information requirements users need to perform a variety of useful banking activities.

In one embodiment of the present invention, there is provided an online banking software product having as its primary user interface a single display screen for presentation on a display device of a personal computer. The user interface includes three simultaneously displayed areas that integrate the banking information and banking tasks for account management, bill payment, and balance determination. In a first display area are listed transaction instructions for a user selected account which are to be sent by the user to a financial institution, such as a bank or clearing house, for processing. These transaction instructions may have various details, such as a description, or an amount. The description indicates the nature of the instruction, such as payment of a bill, transfer of funds, or other transaction instructions.

A second display area that is concurrently displayed with the first display area includes uncleared transactions for the user selected account. These uncleared transactions are created from both transaction instructions that have been sent to a financial institution for processing, but that have not yet been reported as cleared, and from other transactions generated by the user, such as check writing, ATM transactions, debit card transactions, and the like. A transaction instruction is removed from the first display area and listed in the second display area as an uncleared transaction at about the time it is sent to the financial institution for processing.

A third display area is concurrently displayed with the first and second display areas. The third display area includes cleared transactions for the user selected account. The cleared transactions are determined in part from data received from the user's financial institution holding the user's account. Uncleared transactions in the second display area are removed therefrom and listed as cleared transactions in the third display area at a time subsequent to the transaction being cleared by a financial institution.

Finally, the user interface simultaneously displays two different account balances. A first account balance is for the cleared transactions in the user selected account. A second account balance is a combination of both cleared transactions and uncleared transactions in the second display area.

The integration and simultaneous presentation of the three different types of transactions, and two account balances in a single user interface presents a complete view of both financial institution data (cleared transactions, and cleared balance) and customer data (transaction instructions, uncleared transactions and combined balance) on one screen. In this model, the information from the bank becomes the primary, permanent information, like a bank-centric product, and the user's account information in the second display area becomes the temporary information, useful for calculating the actual current balance of the user's account. This integration of information allows the user to perform the integrated tasks of account management and bill payment without having to navigate between multiple different program modules and user interfaces. The integrated user interface thus increases ease of use and reduces both the time taken to perform account management and bill payment, and the likelihood of errors. With this presentation of account information, the user always knows the account balance as currently known by the financial institution, and what the combined balance really is, if all the uncleared transactions suddenly cleared, information which is not presently conveyed together in known software products and online banking systems. This combined balance is particularly useful during bill payment because it allows the user to see the amount of funds available for each bill payment. The Transactor type user can thereby efficiently and quickly make bill payments and avoid overdrafts, without having to navigate to multiple user interfaces or engage in multiple, time consuming tasks.

The display of the cleared and uncleared transactions provides useful information for determining if a vendor or merchant has been paid. In existing personal finance products, the user must search through the check register to see if a transaction has been marked as cleared. In the user interface of the present invention, the user simply looks in the second display area of uncleared transactions. All uncleared payments to merchants are included there, enabling the user to determine if another payment to the merchant is necessary.

The present invention further provides various methods in support of the user interface for performing account management, bill payment, and other related tasks.

BRIEF DESCRIPTION OF THE DRAWINGS

FIG. 7 is an illustration of a user interface in accordance with the present invention.

DETAILED DESCRIPTION OF THE INVENTION

Integrated User Interface

Figure 7:
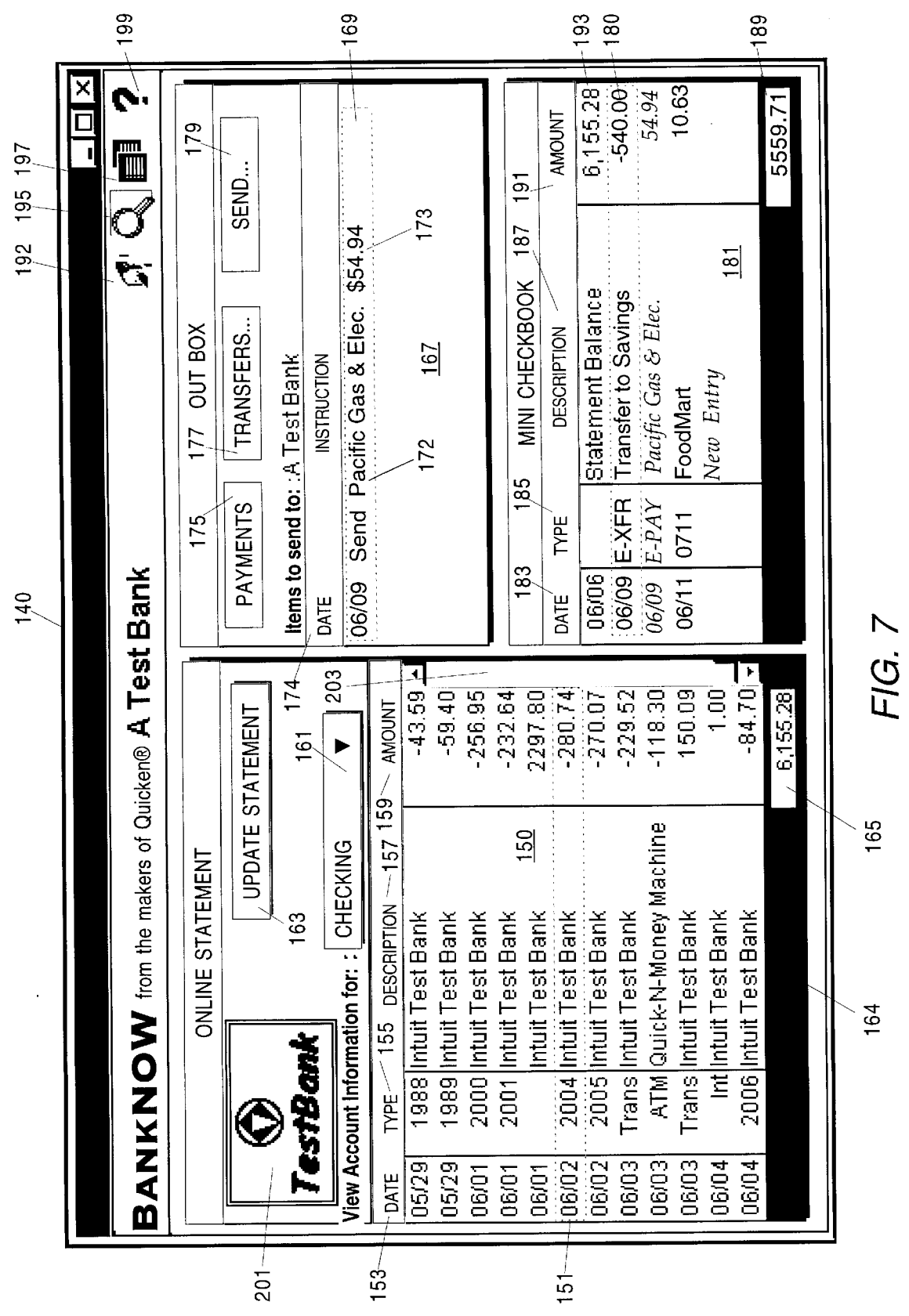
Figure 1:
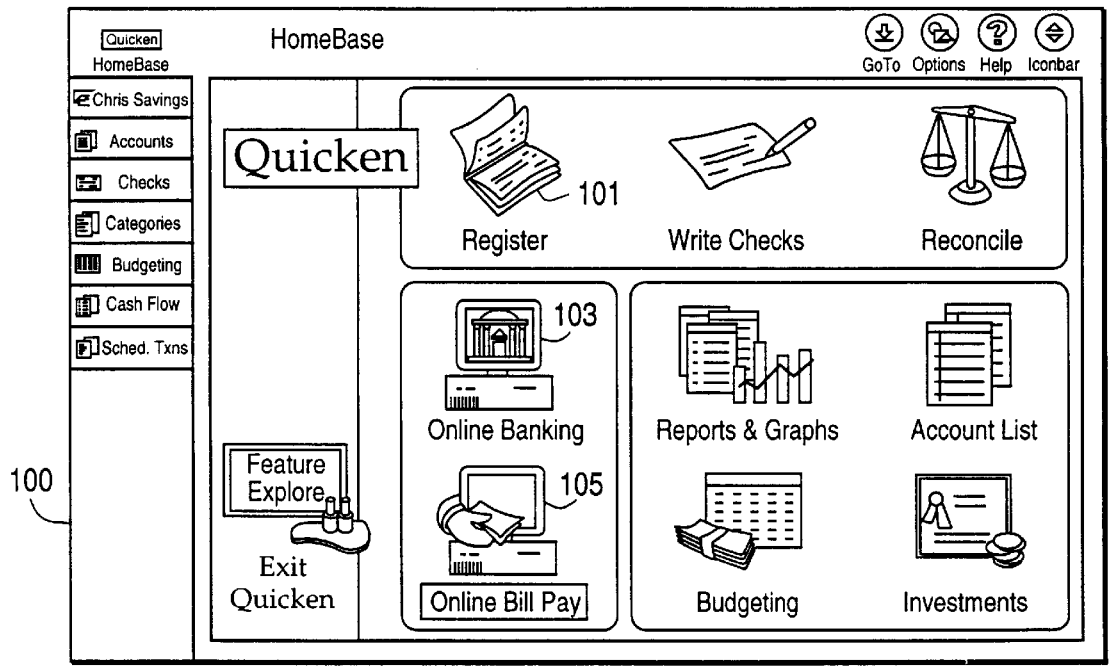
FIG. 1 is an illustration of a user interface of a personal finance software product.

Referring now to FIG. 7, there is shown an illustration of a user interface 140 of a personal online finance software product in accordance with the present invention. The personal online finance software product executes on client or user computer and is coupled over a network to a computer system of a bank or other financial institution.

The user interface 140 comprises three, simultaneously displayed areas: a first area 167, here titled the "Out Box," which lists transaction instructions 169; a second area 181, here titled "Mini Checkbook," which lists uncleared transactions 180; and a third area 150, here titled "Online Statement," which lists cleared transactions according to information received from the financial institution and from the information for stored, uncleared transactions. The organization and placement of the areas in the user interface 140 of FIG. 7 is merely illustrative and not limited by the present invention, and variations in the placement, size, and shape of the areas would be readily apparent to those of skill in the art of user interface design.

Display of Transaction Instructions

The out box 167 contains zero or more transaction instructions 169 that are to be sent to a financial institution for processing. A transaction instruction 169 is a description of an action to be performed by a financial institution or other financial entity or a request for information from a financial institution. A financial institution may be the user's bank, a clearinghouse, or other institution which processes electronic transactions, transfers, or otherwise is involved in the handling of transaction instructions or user's accounts, payments, or fund transfers. Financial entities may include vendors, merchants, billing agencies, banks, brokerages, insurance companies, or the like. Generally, the out box 167 is used to show bill payments to various merchants and fund transfers between user selected accounts.

Each transaction instruction 169 is listed with descriptive information, which may vary depending on the nature of the instruction. Most transaction instructions 169 will include a description 172 and an amount 173. The description 172 indicates some type of action, such as bill payment, fund transfer, information request, and other appropriate information for the action. For example, for a bill payment transaction instruction (here indicated as "Send") information such as the payee of a bill payment is provided. In FIG. 7, the transaction instruction 169 of "Send Pacific Gas & Elec. $54.94" is a bill payment instruction. For a funds transfer transaction instruction 169, the accounts involved in the funds transfer are specified.

In a preferred embodiment, for some transaction instructions 169, such as bill payments, there is additional information of a date 174 by which the transaction instruction 169 should be processed and payment made. This information is used by the processing financial institution to ensure timely payment of the bill. In other cases, the date 174 may be left blank.

Transaction instructions 169 are placed in the out box 167 by clicking with a pointing device (e.g. a mouse) on the payments button 175 or the transfer button 177. Each of these buttons respectively causes the display of an entry form for specifying the various information about the transaction.

Transaction instructions 169 listed in the out box 167 are sent to a financial institution for processing by clicking on the send button 179. This causes each transaction instruction 169 listed in the out box 167 to be sent to the proper financial institution (or other entity) for processing, even where different financial institutions are needed to process different ones of the transaction instructions 169. After a transaction instruction 169 is sent, the receiving financial institution confirms receipt thereof to the personal online finance software product. At about the time of confirmation, the transaction instruction 169 is removed from the out box 167 and listed in the second display area, the mini checkbook 181.

Display of Uncleared Transactions

The mini checkbook 181 lists transactions 180 that have not yet cleared a user selected account at a financial institution. For a checking account, these transactions 180 will typically include checks written on the checking account, cash withdrawals, whether ATM or otherwise, debit card transactions, fund transfers and bill payments made by transaction instructions 169 in the out box 167.

Each transaction 180 is listed with descriptive information about the transactions. This information preferably includes the transaction date 183, transaction type 185, an amount 191, and a description 187 which identifies typically the payee or other useful information. Transaction types are indicated by check numbers for checks, "WDL" or "ATM" for withdrawals, and "E-PMT" for payments, "DEP" for deposits, and "E-XFR" for fund transfers. Debit card purchases are indicated by "ATM".

For example, the uncleared transaction 180 of "Transfer to Savings" was entered by the user on Jun. 6, 1997, and transferred funds in the amount of $540.00 from the present account to the user's savings account.

One of the advantages of the present invention is that it allows a user to track manual transactions in an integrated manner with electronic transaction. The user can directly enter transactions 180 into the mini checkbook 181 for manual transactions, such as writing checks, withdrawals, and the like by clicking on the "New Entry" text. For example, in FIG. 7, the mini checkbook 181 includes as an uncleared transaction 180 a check to "FoodMart", with check number 711 of $10.63. This feature allows the us track their uncleared transactions along with their cleared transactions, and yet maintain the necessary distinctions.

In a preferred embodiment, the first entry 193 in the mini checkbook 181 is always the balance 165 from the online statement 150.

A transaction 180 is removed from the mini checkbook 181 after it has been cleared by a financial institution and the amounts of the transactions 180 debited or credited to the user's account. Transactions 180 are removed from the mini checkbook 181 and listed in the online statement 150 at such time, preferably in response to the user clicking on the update statement button 163. This action initiates an executable process that communicates with the financial institution to determine which transactions have cleared since a last update date 164. These recently cleared transactions are listed as transactions 151 in the online statement 150, and any of unclear transactions 180 that match are removed from the mini checkbook 181.

Figure 2:
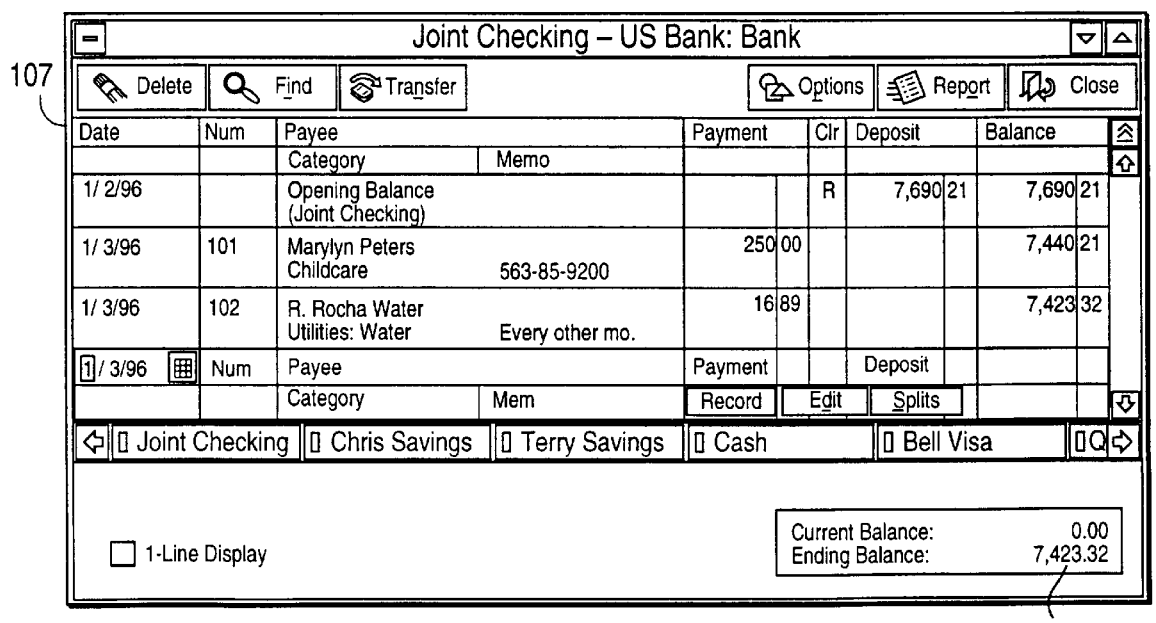
FIG. 2 is an illustration of a checkbook user interface for a personal finance software product.
Figure 3:
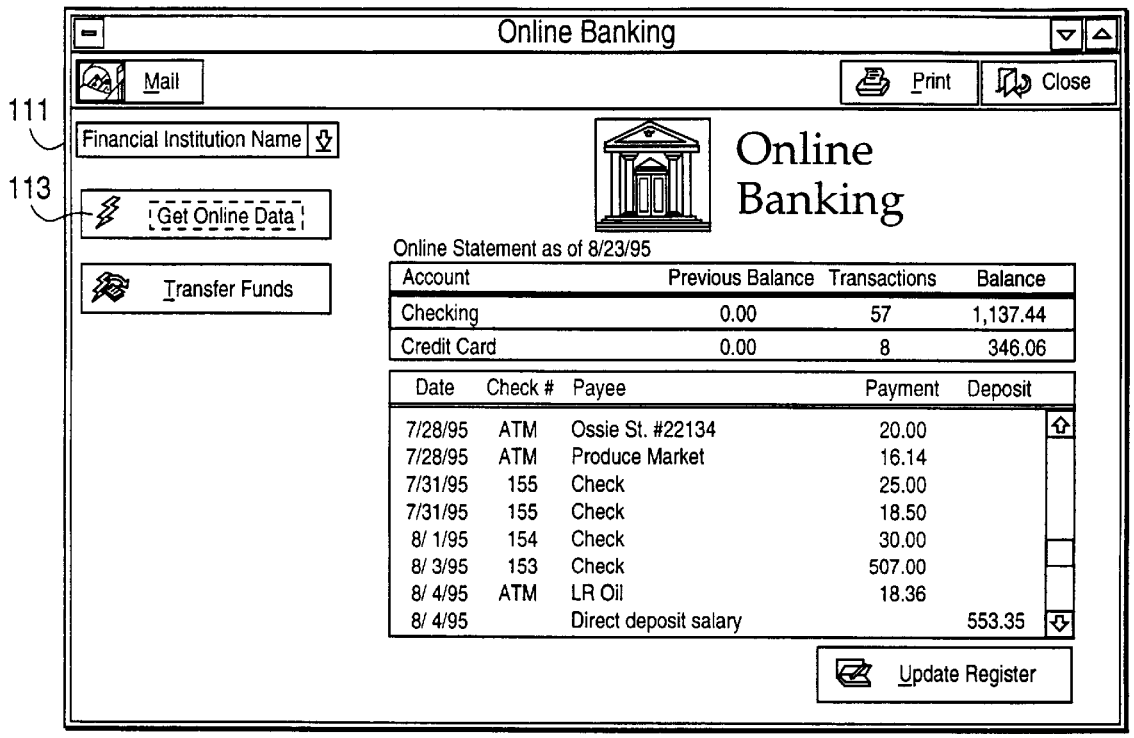
FIG. 3 is an illustration of an online banking user interface for a personal finance software product.
Figure 4:
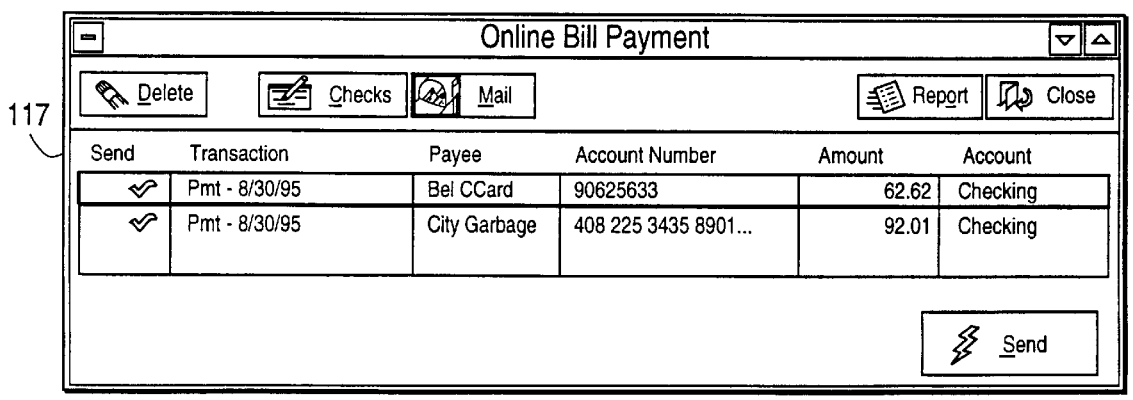
FIG. 4 is an illustration of a bill payment user interface for a personal finance software product.

Accordingly, with the integration of the cleared transaction data from the bank and the uncleared transactions 181, the user can easily determine if a specific payment to a vendor, or a check has cleared by reviewing the mini checkbook 181 following updating of the online statement 150. This is because if the transaction or payment has cleared, it will no longer be listed in mini checkbook 181. The user need not review, as in existing financial software products, the check register such as illustrated in FIG. 2, which contains all transactions, including both cleared and uncleared, in order to locate a specific transaction.

In one preferred embodiment, each transaction instruction 169 in the out box 167 that causes a change in account balance (e.g. bill payments and fund transfers) is simultaneously displayed in the mini-checkbook 181, even prior to sending the transaction instruction 169 to the financial institution for processing. Preferably this copy of the transaction instruction 169 is shown in a distinct color or type font from the transactions 180 listed in the mini checkbook 181. For example, in FIG. 7, the transaction instruction 169 to send payment to Pacific Gas & Elec. is simultaneously displayed, before being sent to the financial institution, in the mini-checkbook 181, here with a distinctive typeface. The copy of the transaction instruction 169 is used, along with the transactions 180 to determine the running balance 189. This feature thus lets the user assess the impact on their running balance 189 for each transaction instruction 169. This feature is especially useful to the Transactor type user, who is concerned with avoiding overdrafts of their account.

Display of Cleared Transactions

The online statement 150 shows the financial institution's view of the user selected account. The user selects the account by clicking on the drop down list button 161, causing the display of a list of available accounts. The name of the selected account is reflected on the button 161. The online statement 150 preferably includes for each transaction 151 a date the transaction 151 cleared, a type 155 (or number for checks), a description 157, and an amount 159. The online statement 150 also indicates the last date 164 on which the list of displayed transactions 151 was updated. The user can update the online statement 150 at any time by clicking on the update statement button 163. The update process is as described above.

Figure 5:
FIG. 5 is an illustration of an account user interface for an online banking software product.
Figure 6:
FIG. 6 is an illustration of a user interface for an online banking software product for downloading account data.

The data for the cleared transactions 151 received from the financial institution during an update process typically comprises only a date, an amount, and a transaction type. An example of this limited information is shown in FIG. 5 of the account history screen from Wells Fargo's banking product, as described above.

To overcome this limitation of conventional products, the description 157 for the cleared transaction 151 is taken from the description 187 as the uncleared transactions 180 pending in the mini-checkbook 181 are matched against the cleared transaction data from the financial institution by the update process. This process allows the online statement 150 to reflect a more complete description of the cleared transactions 151 than would otherwise be available from the financial institution's own records.

By limiting the mini checkbook 181 to just those transactions that have not yet cleared, the present invention gives primacy to the online statement 150, unlike conventional personal finance software products which give primacy to the user's checkbook. Even so, the user is able to store uncleared transactions, including checks, withdrawals, and the like that they create outside of the use of the personal online financial product. Conversely, by including the mini checkbook 181 with the online statement 150, the present invention overcomes the limitations found in existing purely bank-centric software products, which do not have any ability to store uncleared transactions entered by the user or to integrate this information with the cleared transactions 151 to provide a running balance 189.

Account Balances

The user interface 140 of the present invention further enhances the integration of account information by providing two distinct account balances for the user. The first account balance 165, the online statement balance, is the balance for the current set of cleared transactions 151, based on downloaded transaction data from the financial institution. Assuming that this balance 165 has been recently updated and accounts for all cleared transactions according to the financial institution, then it properly reflects the user's account balance in the user's financial institution. Thus, this balance 165 provides the user with the view of the account that the financial institution has. The online statement balance 165 is preferably used to create the first entry of the statement balance 193 in the mini checkbook 181.

A second account balance 189, the current available balance or running balance, is based on both the cleared transactions 151 in the out box 167 and on the uncleared transactions in the mini checkbook 181. This account balance 189 is the user's current balance as actually reflecting the current funds that are available, given all of the uncleared transactions and transaction instructions 169, particularly for payment of bills, funds transfers or other electronic or manual transactions. It should be noted that while the first and second account balances 165, 189 are shown in the online statement 150 and mini checkbook 181 respectively, they may be readily positioned in other areas of the user interface 140, so long as both balances are present for the user's inspection.

While the online statement 150, the mini checkbook 181, and the out box 167 may be positioned variously about the screen in accordance with the present invention, the illustrated orientation has several advantages. Placing the mini checkbook 181 in the lower right of the screen, results in the current balance 189 being located in the lower right corner, which corresponds in many spreadsheets to the most significant figure or total on the spreadsheet. This in turn reinforces the saliency of the current balance 189 to the user. In particular, Transactor type users are most concerned with the current balance 189 and its location thus is particularly beneficial to them. Placing the bank statement to the left allows for easy reading and reference of banking transactions. Users can cross-check banking statement entries with uncleared transactions and transfers by convenient left-to-right eye movements.

The simultaneous display of the transactions in the online statement 150, the mini checkbook 181, and the out box 167, along with both account balances, provides the user with a complete view of the user selected account, and allows for integration of account management, bill payment, checkbook transactions, and balance determination, all through a single user interface display. At any time the user can see the status of all of her banking activities with a single glance.

Additional Elements

Various other useful features are provided in the user interface 140. A help icon 199 invokes a help subsystem providing various screens of instructions for performing various tasks, such as making payments, transferring funds, updating the online statement, and the like. A find icon 195 invokes a find function which allows the user to search for transactions by specification of various items of information, such as date, payee, amount, type, and the like. Scroll bars 203 provide for a scrolling display of information in each of the display areas. Financial institution icon 201 indicates the current financial institution to which the personal online financial application is connected, and may be used to invoke other functionality, such as the display of information about the financial institution, including its various products, services, and offerings.

Information Flow

Figure 8:
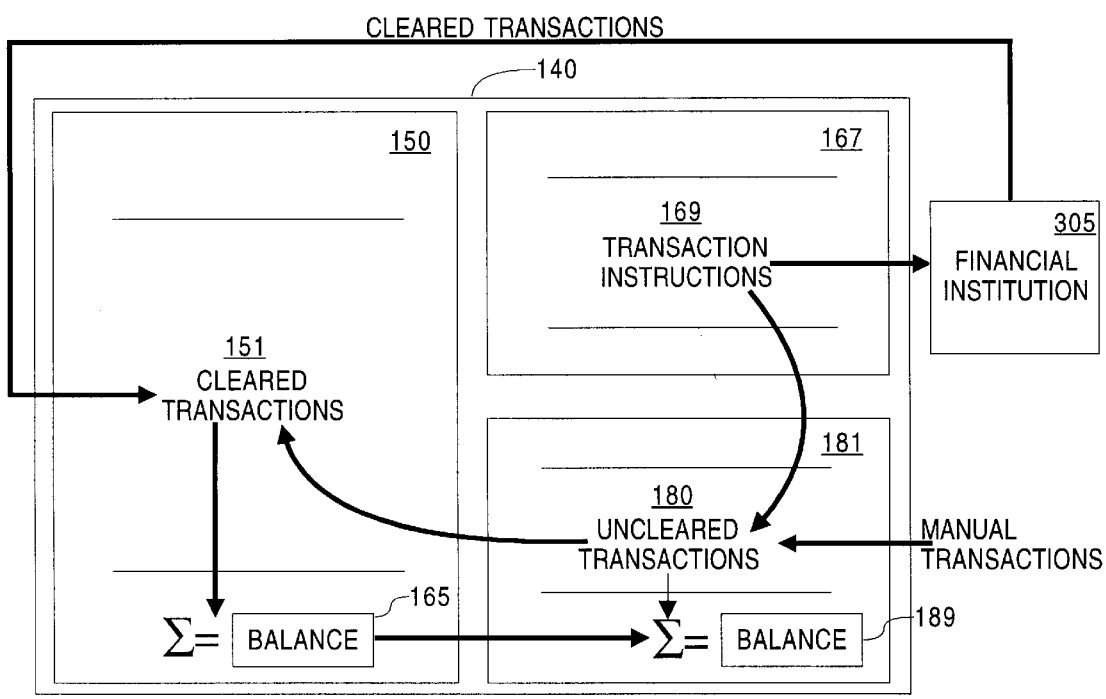
FIG. 8 is an illustration of information flow within a user interface in accordance with the present invention.

Referring now to FIG. 8, there is shown one schematic view of the user interface 140 of the present invention along with the flow of information therein with respect to bill payments and fund transfer transactions. Bill payments and fund transfers start out as transaction instructions 169 in the out box 167, the first display area. After the user sends the transactions to the financial institution for processing, they are "moved" to the mini checkbook 181, second display area, where they are considered as uncleared transactions 180. The second account balance 189, the running balance, is updated as additional uncleared transactions 180 are placed in the mini checkbook 181, based on the value of the online statement balance 165, and all uncleared transactions 180 and transaction instructions 169. In a preferred implementation, the running balance 189 is the online statement balance 165 minus the total of the mini-checkbook transactions 181 (including transaction instructions 169 in the out box 167).

When the user updates their account by selecting update account 163, data for cleared transactions is downloaded from the financial institution and compared against stored data for the uncleared transactions 180. Uncleared transactions 180 in the mini checkbook 181 are matched to cleared transactions, and those that have been cleared are moved to the online statement 150, and are no longer listed in the mini checkbook 181. These transactions include both fund transfers and payments that were initiated in the out box 167, ATM, point of sale, and checkbook transactions that were directly entered by the user in the mini checkbook 181. In addition, the online statement balance 165 is updated to show the new balance for all cleared transactions. Conceptually and visually transactions move through the user interface in a circular fashion from the out box 167 to the mini checkbook 181 to the online statement 150. This movement through the user interface occurs with a large variety of different physical positions of the various components.

Hardware Architecture

Figure 13:
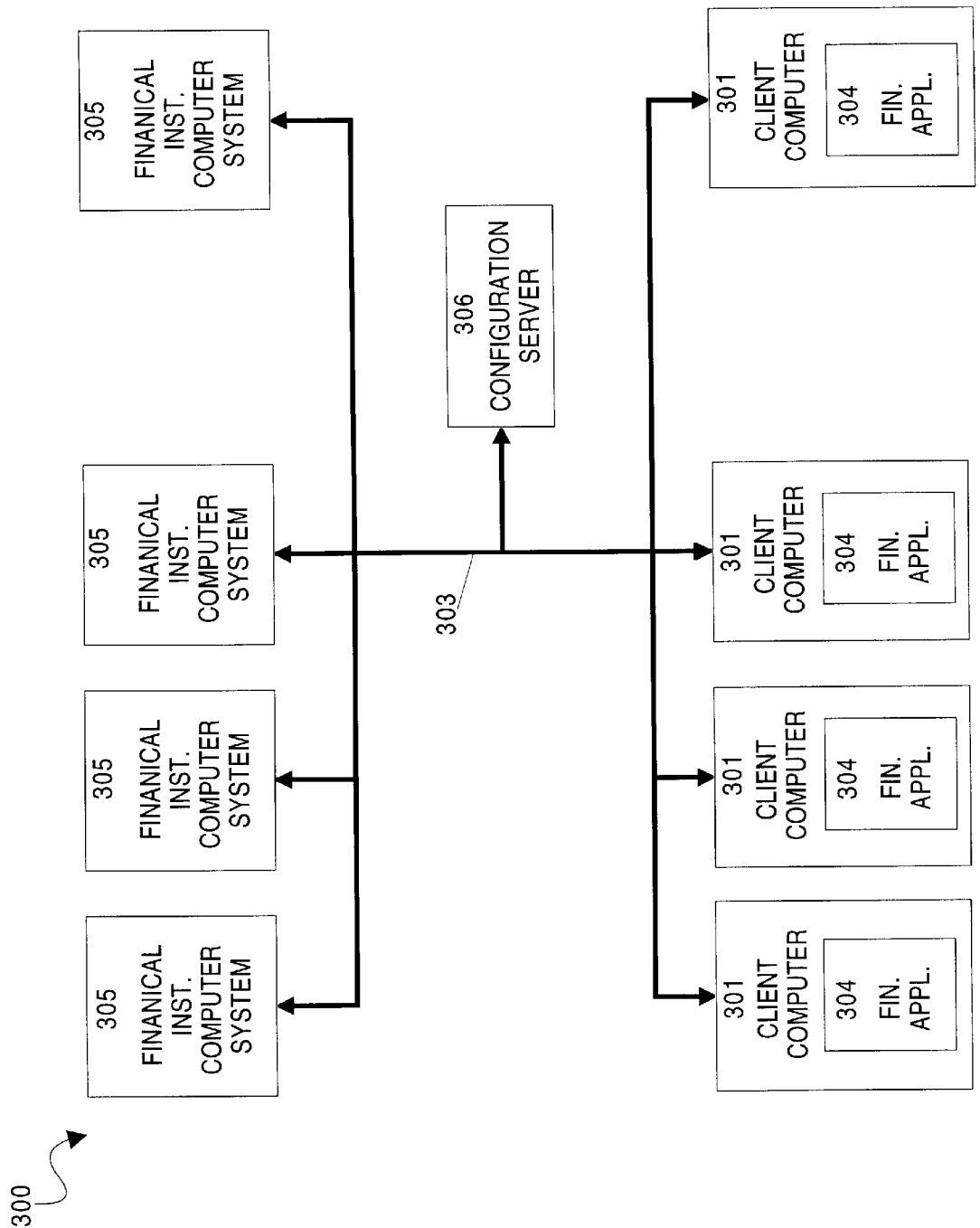
FIG. 13 is an illustration of a system in accordance with the present invention.

Referring now to FIG. 13, there is shown the architecture of a system useful for supporting the user interface of the present invention. In such a system 300, there is provided at least one client computer 301 communicatively coupled by a network 303 to one or more financial institution computer systems 305.

A client computer 301 is of conventional design, and includes a processor, an addressable memory, and other conventional features (not illustrated) such as a display, a local hard disk, input/output ports, and a network interface. The display is of conventional design, preferably color bitmapped, and provides output for the user interface of the present invention. The input/output ports support various input devices, such as a keyboard, mouse, and the like, for inputting commands and data. The network interface and a network communication protocol provide access to the financial institution computer systems 305, along with access to the Internet, via a TCP-IP type connection, or to other network embodiments, such as a WAN, LAN, MAN or the like. In the preferred embodiment the client computer 301 may be implemented on an Intel-based computer operating under Microsoft Windows 3.1, Windows95, or WindowsNT operating system, or a SPARC-based computer operating under UNIX, or any other equivalent devices.

In accordance with the present invention, the client computer 301 executes the personal online finance application 304 in memory. The application 304 is comprised of a number of executable code portions and data files. These include code for creating and supporting the user interface 140, and a transaction data for storing various types of transaction information, including transaction instructions 169, uncleared transactions 180, payee information, account information, and various registration and other user data.

The application 304 may be provided to the client computer 301 on a computer readable media, such as a CD-ROM, diskette, 8 mm tape, or by electronic communication over the network 306 from one of the financial institution computer systems 305 or other distributors of software, for installation and execution thereon.

The financial institution computer systems 305 are also conventional computer systems, providing transactions processing and clearing functionality for the client applications. One or more of the financial institutions may operate as a clearinghouse to provide transaction processing of banking transactions on behalf of the other financial institutions.

Software Architecture

Figure 14:
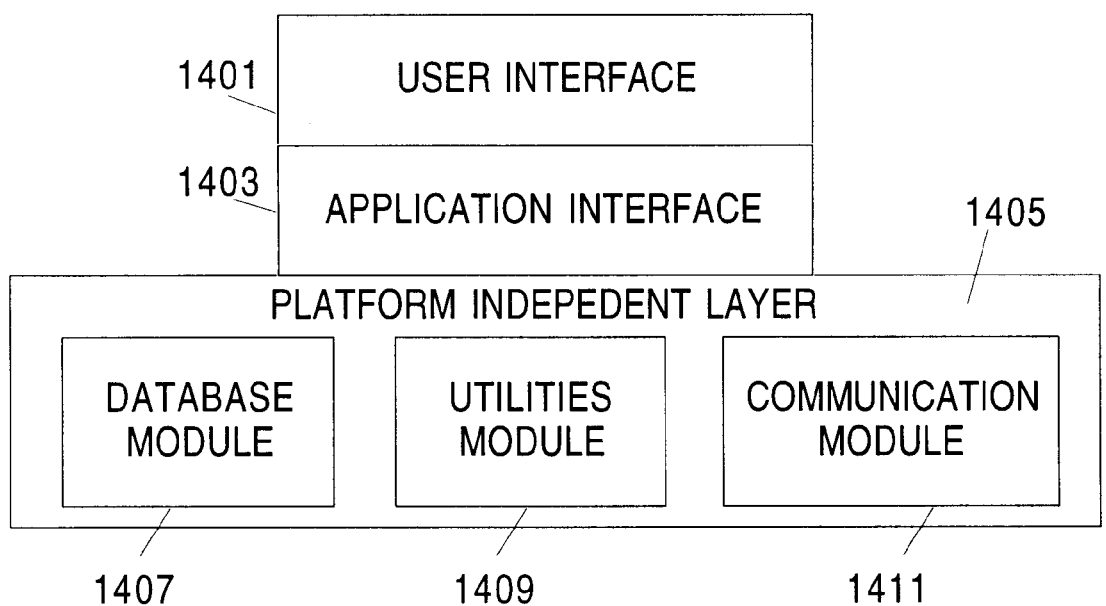
FIG. 14 is an illustration of the software architecture for a personal online financial software product in accordance with the present invention.

Referring now to FIG. 14, there is shown a model of the software architecture for the personal online finance application 304 providing the user interface of the present invention.

The personal online finance application 304 comprises several modules. A user interface module 1401 provides various platform specific implementations of the user interface, and will differ from one computer platform to another. The user interface module 1401 processes user responses and takes the necessary actions in accordance with the various operations set forth herein. The user interface module 1401 includes the following modules.

A windowing module that manages the display of various windows, dialog boxes, and other displays, and receives user inputs and passes them to other modules.

A graphics module provides for manipulation bit map images, such as icons and other graphics.

A widgets module provides the implementations of various user interface elements, such as the various buttons and fields of the user interface for receiving data and user commands.

A glue layer couples a transaction database, which stores the user's transactions, with the user interface widgets. The glue layer selects data from the transaction database and provides it to the widget for further processing.

An event manager provides events to the glue layer to fetch data from the transaction database and update the appropriate user interface elements and widgets.

A set of application objects transfer data between the various modules of the application 304, such as between the user interface and the transaction database. This enables the various modules to be easily updated without having to change their specific interfaces to the other modules.

A report generation module generates reports, such as summaries of the transactions, by date, type, payee, and the like.

The application interface module 1403 enables the personal online finance application 304 to execute as a plug-in in various online environments such in America Online™, Netscape Communications Inc.'s Navigator™, and Microsoft Corp.'s Internet Explorer™. This module is implemented on a per environment basis. When invoked, this module initializes the rest of the personal online finance application 304 and on completion ensures its safe termination. The application interface module 1403 is a hidden window that transfers data from the user interface and the rest of the modules using a messaging architecture. This module transfers state information from the operating environment to the user interface module 1401, and to the other modules. This enables the application 304 to be used with a variety of different operating environments.

A platform independent layer 1405 comprise of three modules. All these modules may be recompiled on a different platform and their implementations do not vary significantly on other desktops.

The database module 1407 is an interface to the user's data, which is stored in the transaction database. Records may be fetched or saved by the database module 1407 and this module allows all the other modules to access the transaction database. The database module 1403 preferably stores the user's data in combined relational-hierarchical data model, though other data models may also be employed. A hierarchical model is used to organize accounts per financial institution, such that all transactions for each account are stored with the account. A relational model is used for individual transactions, to provide associations between payees, amounts, and individual transactions within each account. Data that is stored includes payment data, transactions data, funds transfer data, and e-mail data. Transaction records may be variable length. Each record in the transaction data is marked as being either in the online statement 150, the mini checkbook 181, or the out box 167, and as being either reconciled or unreconciled. This marking allows for subsequent auto-reconciliation and reporting. Some transactions in the online statement 150 may be unreconciled if the user did not enter them first in the mini checkbook 181.

The utilities module 1409 provides general utility functions that handle rote tasks such as processing dates, times, bitmaps, configuration entries, and other commonly used implementation utilities. The utilities module 1409 includes the following modules:

An error message handling module handles errors generated during data entry, and transaction processing with a financial institution, and communications.

A file manipulation module enables accessing files within the user's computer file system.

A data formatting utility provides formatting to display, print, and otherwise output banking data on various output devices.

An auto-reconciliation module automatically reconciles the mini checkbook 181 the online statement 150, and the transaction database.

A memory management module provides for allocating and reclaiming memory.

A public key encryption utility provides public key encryption for transmitting transaction instructions and other data with a financial institution.

A private key encryption utility for local encryption of the data files using a private key algorithm.

A database access object provides a high level interface to the transaction data to retrieve and store data. This utility makes high level requests (e.g. provide all transaction data) to the database module, which obtains the data directly from the transaction database.

The communication module 1411 enables the personal online finance application 304 to connect to a financial institution computer system 305 and transmit information back and forth. Communication is provided using TCP/IP communication protocols for Internet based communications, or using a conventional private-line modem based protocols for direct communication between the application 304 and a financial institution 305.

Use Case Model

Figure 15:
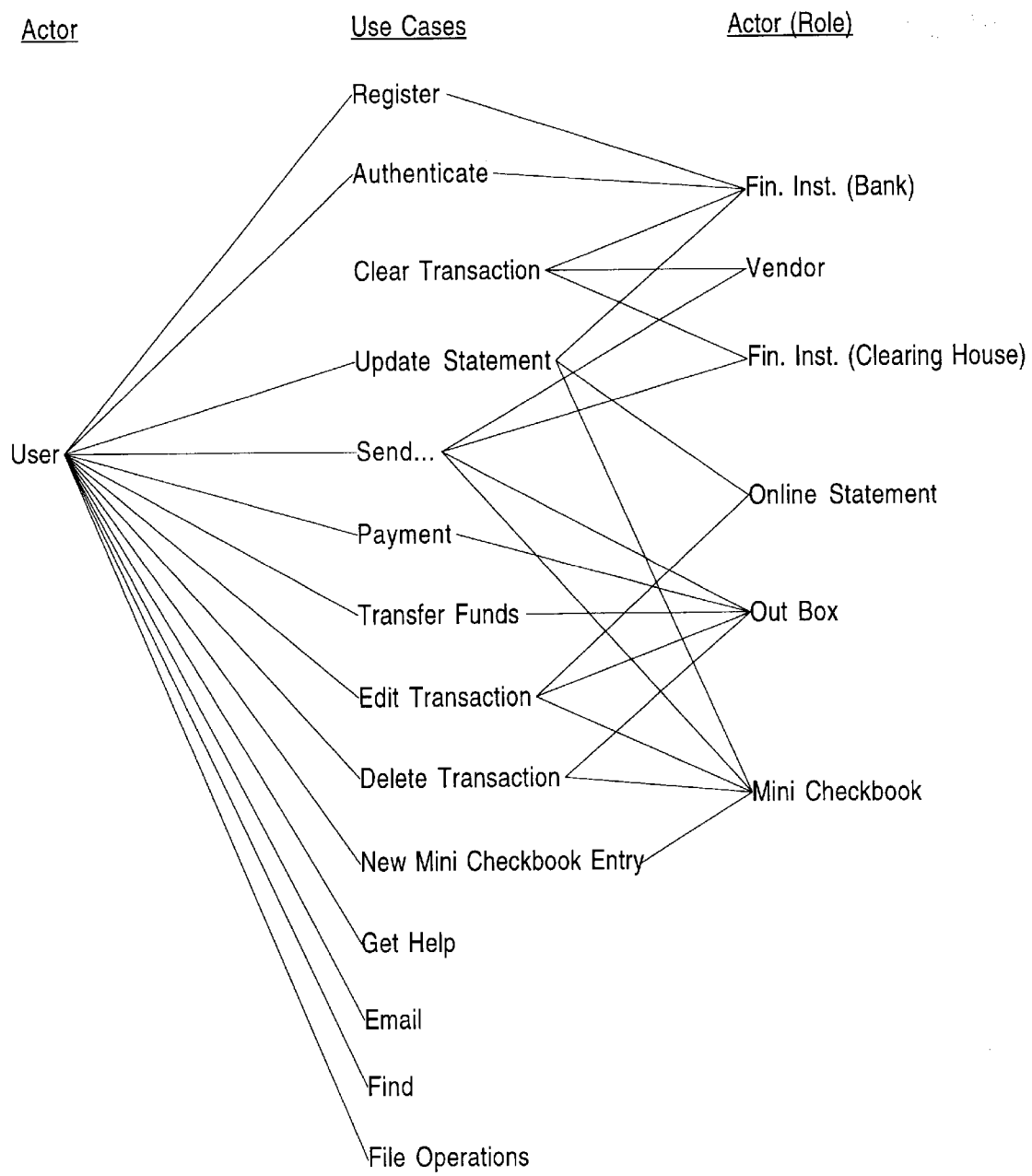
FIG. 15 is an illustration of the use case model for a system in accordance with the present invention.

Referring now to FIG. 15 there is shown the use case model for a system in accordance with the present invention. The personal online finance application 304 interacts as a client with financial institution computer systems 305 to effect one or more of the use cases, or functions of the system. Generally, the system includes two types of use cases: 1) those that involve the user and external actors in the system, such as financial institutions in the role of the user's bank or a transaction clearing house, or a vendor who receives payments; and, 2) those that involve the above described elements of the user interface 140 and its ancillary components.

Application Launch

In a preferred embodiment using Internet based communications, each time the application 304 is launched and makes a successful connection to an Internet service provider, a configuration file is downloaded to the user's computer from a previously specified configuration server 306. This configuration file includes upgrade information and financial institution description information.

The upgrade information notifies the user of the newer version of the application 304. The user may then fetch this version manually (using a provided network address or uniform resource locator) or automatically let the application 304 upgrade itself through execution of an upgrade script and FTP connection to a server containing the new version.

The configuration file contains information about supported financial institutions. This includes the financial institution's name and its logo as a binary file. This logo is then used in the user interface display. Also included is information identifying each financial institution's computer system 305, including its IP address, port number, and domain name. This information is used during the connection process to the financial institution computer system 305.

Registration

In a preferred embodiment, the personal online finance application 304 enables the user to enter account information for a number of financial institutions and payees in order to register the user's account for later transactions. For each financial institution, the account information includes an account number, an account type which could be one of checking, savings, money market, line of credit and credit card, an account description, and the financial institution's routing number. The user also enters a social security number. Checking accounts and money market accounts may additionally be enabled for bill payment, which will allow users to write electronic checks from these accounts. Account creation is handled internally by the database module 1407, which modifies the transaction database to include additional accounts using the registration information.

Figure 9:
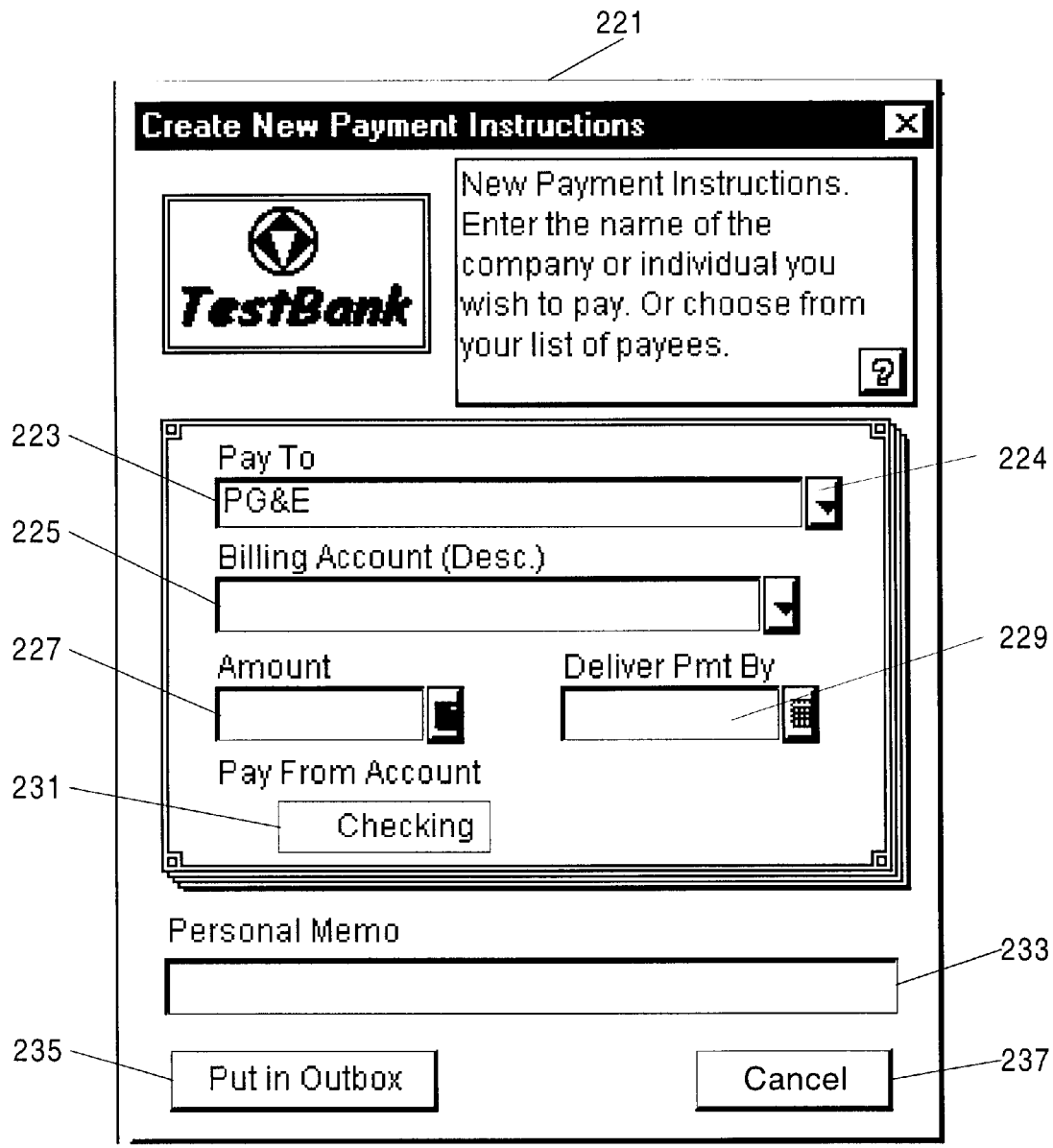
FIG. 9 is an illustration of a user interface for creating a new payment transaction.

Once the accounts have been registered, the user may create transactions in these accounts. Account information may be modified at any time, but this will affect all existing transactions that are related to that account. New accounts may be added or accounts may be deleted when necessary. The user may also enter a list of payees to whom the user intends to make payments. Each payee is characterized by a name, an account number, an address, and a telephone number. Payee information is stored with each account separately in the transaction database Bill Payment Referring again to FIG. 7, a user enters a new transaction instruction 169 for paying bills by clicking on the payments button 175. This invokes a data entry form for bill payment, one example of which is illustrated in FIG. 9. In this new payment form 221, the user enters data defining the payment to be made. The user enters a payee in payee field 223, either by direct text entry or by selecting a payee from a list of known payees using the dropdown button 224. The user enters an account number into the account field 225; this may also be done by text entry or menu selection. An amount is placed in the amount field 227. In one preferred embodiment, the date by which the payment must be made to the payee is entered in the due date field 229. The source account field 231 indicates the current user selected account from which payment may be made. The user may optionally enter a personal note in the memo field 233. When the payment transaction form 221 is complete to the user's satisfaction, the user clicks the "put in out box" button 235. A transaction instruction 169 for this transaction will then appear in the out box 167. The database module 1407 updates the transaction database to indicate the transaction instruction as being associated with the out box 167. The user can cancel the payment by clicking on the cancel button 237.

Figure 10:
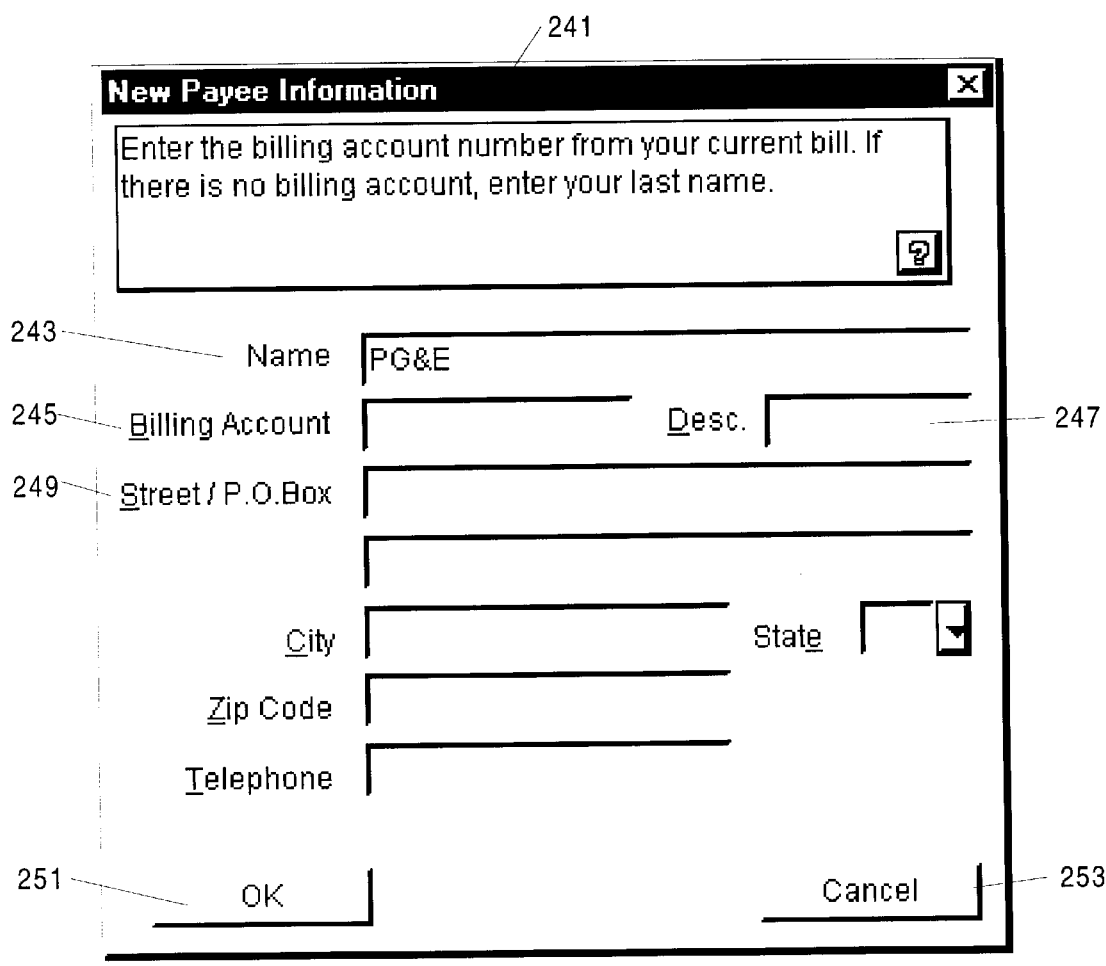
FIG. 10 is an illustration of a user interface for creating a new payee record.

The user may create a new payee for inclusion in the list of payee by completing a new payee form 241, an example of which is illustrated in FIG. 10. Here, the user enters the name 243 of the payee, along with the billing account number 245, a description 247 of the account, and address information 249. The user can confirm 251 or cancel 253 the new payee information. New payees are updated to the transaction database with the account they are associated with.

Fund Transfers

Figure 11:
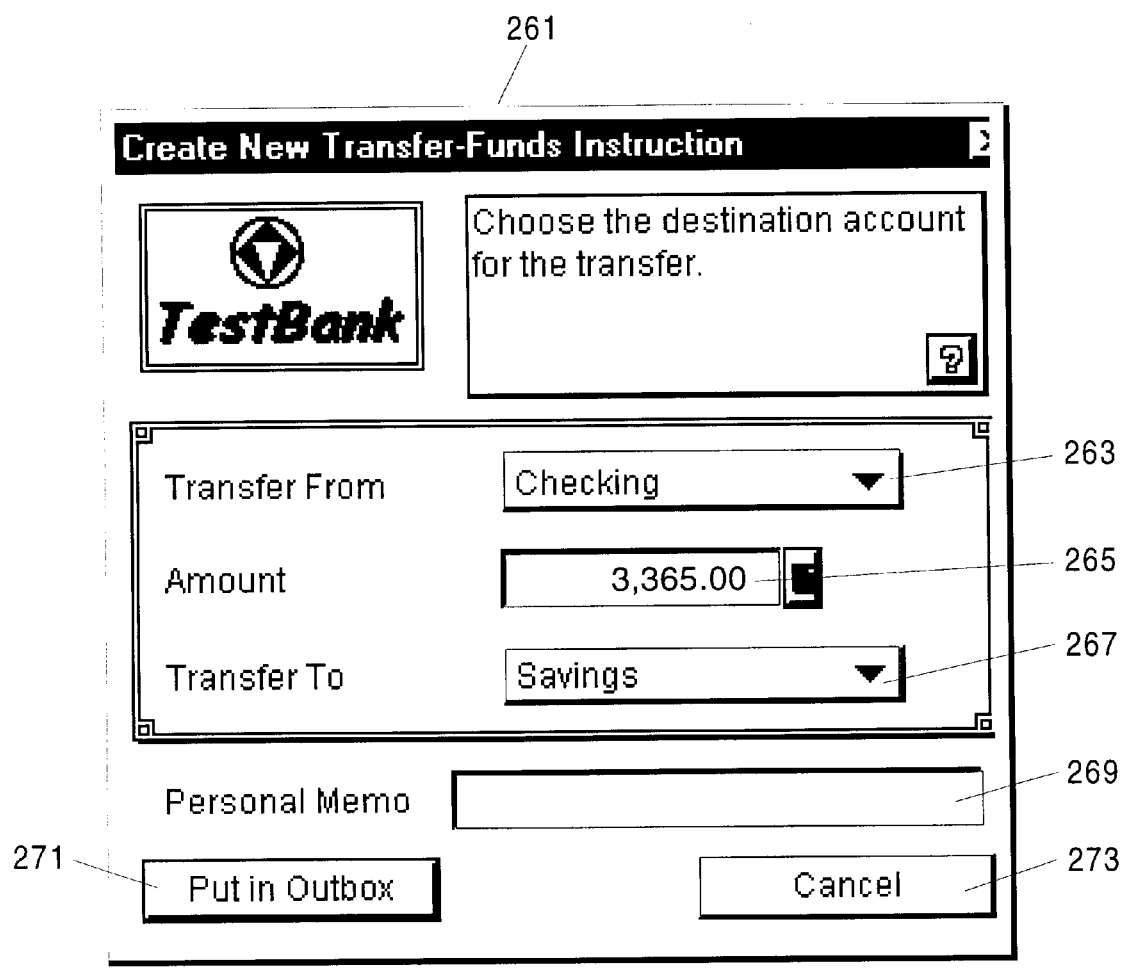
FIG. 11 is an illustration of a user interface for creating a funds transfer transaction.

Fund transfers are created in a manner similar to bill payments. The user first clicks the transfer button 177 in the user interface 140 of FIG. 7, causing the display of a fund transfer form 261, one example which is shown in FIG. 11. The user completes the form 261 with the source account 263 (via a drop down list), the amount to be transferred 265, and the target account 267 into which to transfer the funds (also a drop down list). The user can record a personal memorandum about the funds transfer in the memo field 269. The user confirms the transfer by clicking the put in out box button 271, which adds the transaction to the out box 167. For an approved funds transfer, the database module 1407 updates the transaction database to indicate the transaction instruction as being associated with the out box 167. The user may cancel the transaction by clicking on the cancel button 273.

Mini Checkbook Transactions

As noted above, the user may enter into the mini checkbook 181 non-online transactions, such as checks, withdrawals, debit card transactions, point of sale transactions, credit card transactions for credit card accounts, and the like. These transactions 180 are created by entering the field information directly in the last entry in the mini checkbook 181 which is indicated by the "New Entry" text, and providing the date 183, type 185 (if appropriate), description 187, and amount 191. A new mini checkbook transaction 180 is created in the transaction database by the database module and marked as being in the mini checkbook 181.

These transactions 180 are properly placed in the mini checkbook 181 since at the time of creation they are uncleared. Once a user transaction 180 is cleared, it is moved to the online statement 150, in the manner described, and its entry in the transaction database is updated accordingly.

Once entered, the current available balance 189 is automatically updated to reflect the new transaction 180, again, taking into account the online statement balance 165. FIG. 8 illustrates the information flow for such computations.

Update Statement

Referring again to FIG. 7, a user updates the online statement 150 by clicking the update statement button 163. The personal online finance application 304 establishes a network connection with a financial institution 305, as previously designated by the user during the registration process. The personal online finance application 304 connects to the financial institution computer system 305 using TCP/IP protocols, and the network address (IP Address), port number, and domain name for the financial institution computer system 305 from the configuration file.

When a successful connection occurs, the personal online finance application 304 creates a request file that includes a request for all cleared transactions since the date 164 of the last update of the online statement. This file is compliant with formats such as Open Financial Exchange (OFX) and the NPC file formats.

To provide security, the personal online finance application 304 provides for user authentication during banking transactions, and file encryption of transmitted data and instructions. The request file is preferably encrypted using RSA™ 1024 bit triple DES encryption. The request file is encrypted with the public key of the receiving financial institution, and then transmitted to the financial institution computer system 305. The financial institution computer system 305 receives and decrypts the request file using a private key held by the financial institution.

The financial institution computer system 305 creates a response file that contains the set of transactions that have been cleared for or at the financial institution since the date 164 of the last update of the online statement 150. This response file is then encrypted with the financial institution's private key and sent back to the personal online finance application 304. During this time, the transmission status is constantly available to the user. The user may abort a transmission if necessary.

On successful receipt of the response file by the personal online finance application 304, the application first decrypts the response file with the financial institution's public key and then processes the contents. This processing includes extracting each of the cleared transactions from the response file and storing them in the transaction database via the database module 1407. Each of these transactions is marked in the transaction database as being unreconciled, and as being part of the online statement 150.

The personal online finance application 304 then triggers an auto-reconcile module which matches the cleared transactions received in the response file with uncleared transactions 180 in the mini-checkbook 181. The reconciled items are removed from the mini-checkbook 181 as described above.

Auto-reconciliation is as follows. As noted above, each transaction in the transaction database has been previously marked as either reconciled or unreconciled, and as whether it is in the online statement 150, mini checkbook 181, or in the out box 167

Each item in the mini checkbook 181 is compared with all unreconciled transactions in the online statement 150. For unreconciled transactions in the online statement 150, the only information available in the transaction database is that received from the financial institution in the response file. This information includes only a date, amount, and transaction type, since the financial institution encodes no other information for each transaction. Accordingly, to reconcile these items, the transactions in the mini-checkbook 181 are compared against the unreconciled transactions in the online statement 150.

First, transactions in the mini-checkbook 181 which correspond to paper-checks written by the user are matched against transactions in the online statement 150. A match is based on identity of specified criteria. For these transactions, the match is based on identical check numbers. When a match is made, the transaction is deleted from the mini-checkbook 181 as displayed on the screen. The corresponding entry in the online statement 150 is marked in the transaction database as being reconciled and on the screen as being matched. At this point there are two records for the same transaction in the transaction database, and so one of these records is deleted from the transaction database.

After attempting to match all mini-checkbook 181 transactions that correspond to paper-checks written by the user, the auto-reconciliation module then selects transactions of other types (payments, deposits, and withdrawals). Every mini-checkbook 181 transaction that has not already been attempted to be matched is now compared by amount with transactions of the same type in the online statement 150. If there is an exact match, the transactions are compared by date, within a date range of ±7days. If both conditions are satisfied, the transaction is considered matched.

Matched transactions in the online statement 150 are then rendered in a different color to signal to the user that the transaction is reconciled. Again, the entry in the mini checkbook 181 is removed, and one of the entries in the transaction database is deleted.

If a mini-checkbook 181 transaction does not match an unreconciled transaction in the online statement 150, it stays in the mini-checkbook 181.

It is possible that some items in the online statement 150 do not match with any items in the mini-checkbook 181. This situation arises when the user fails to record transactions in the mini-checkbook 181. Failing to record such transactions could lead to the erroneous calculation of the running balance 189.

Once the mini checkbook 181 is reconciled, the running balance 189 is updated. This is done by taking the statement balance 165 and subtracting the total from all transactions 180 in the mini checkbook 181. The running balance 189 is also updated each time a new entry 180 is made in the mini checkbook 181.

Figure 16:
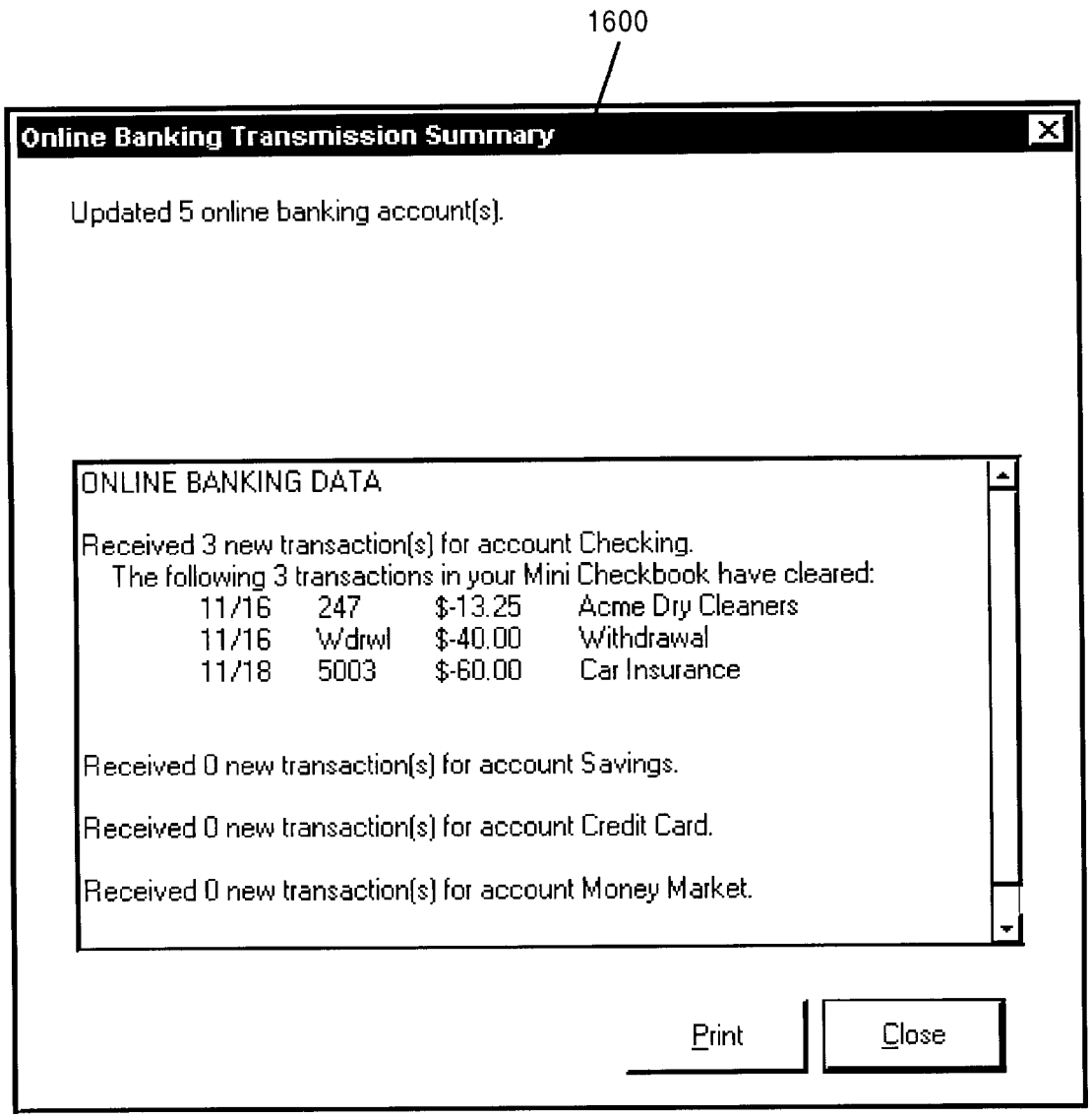
FIG. 16 is an illustration of a transmission summary following an update and auto-reconciliation.

Upon completion of the auto-reconciliation, a transmission summary is displayed to the user. The transmission summary lists the results of the reconciliation process, including the number of transactions matched. FIG. 16 illustrates a transmission summary 1600 following the update and auto-reconciliation process.

Send Transactions

Referring again to FIG. 7, a user sends transaction instructions 169 from the out box 167 by clicking the send button 179. The personal online finance application 304 initiates a connection with the financial institution computer system 305 as described above.

When a successful connection occurs, the personal online finance application 304 creates a transaction instruction file of all transaction instructions 169 in the out box 167. This file is compliant with formats such as Open Financial Exchange (OFX) and the NPC file formats. The file is encrypted and sent as described above to the financial institution computer system 305.

The financial institution computer system 305 receives and decrypts the transaction instruction file using a private key held by the financial institution, and performs the necessary actions to process each of the transaction instructions 169 in the received file, updating the user's account(s) as needed, and communicating with other financial institutions if necessary. Processing of transaction instructions is conventional.

When the transaction instruction file is completely processed, the financial institution computer system 305 creates a response file, encrypts it using the private key of the institution, and transmits it back to the personal online finance application 304. The response file contains encoded results from the transaction instructions, indicating whether each transaction instruction 169 was successfully processed, and if not, a status code indicating the reason for an unsuccessful instruction.

On successful receipt of the response file by the personal online finance application 304, the application decrypts the response file and then processes the contents. This processing includes determining if each transaction instruction was successfully processed, and if not, the reason for an unsuccessful transaction instruction. Each transaction instruction 169 in the out box 167 that was successfully processed is removed from the out box 167 and placed in the mini checkbook 181. This is done by updating the coding for the transaction instruction in the transaction database.

Figure 17:
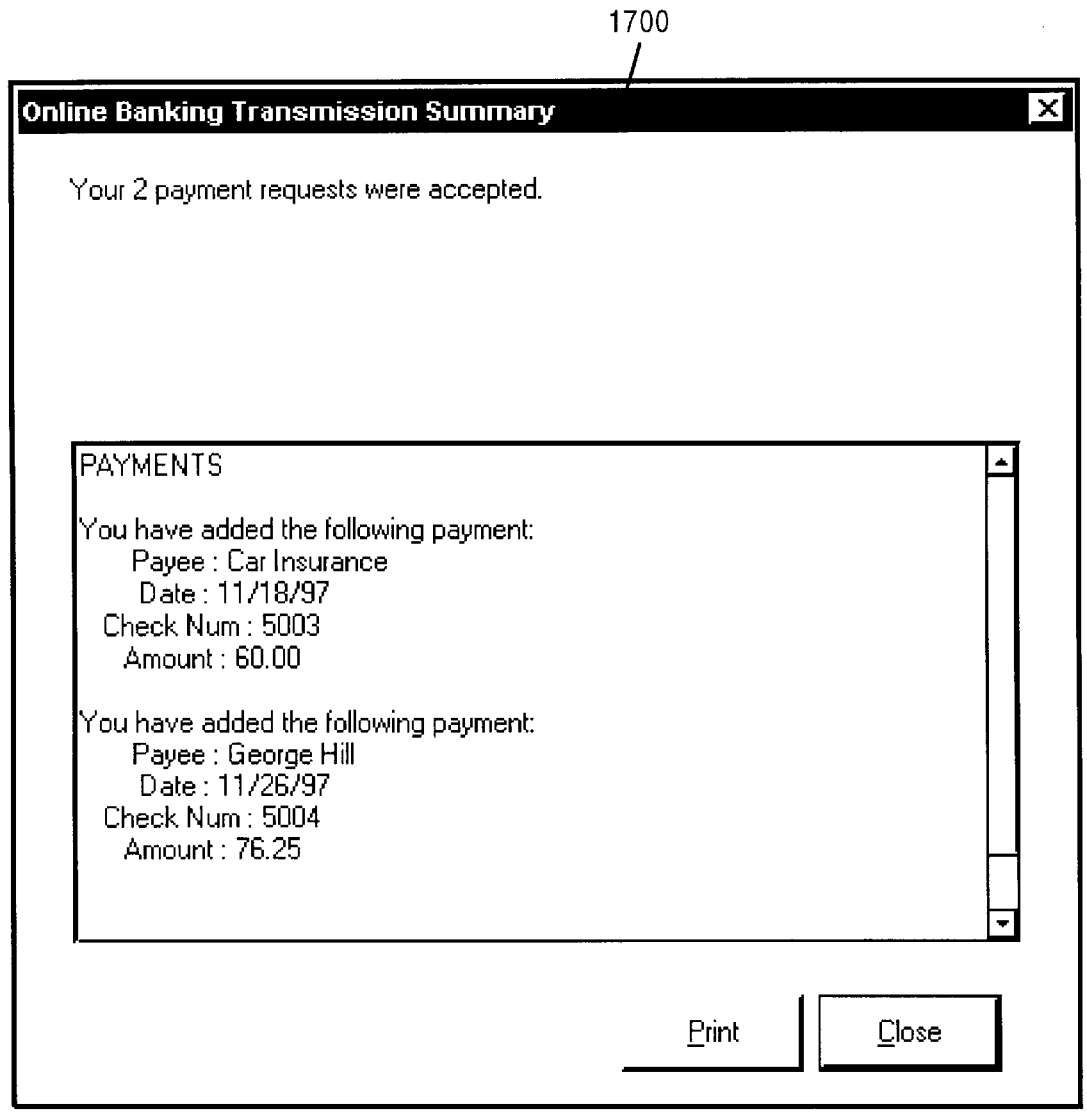
FIG. 17 is an illustration of a transmission summary following transaction processing of out box transactions.

The personal online finance application 304 then displays a transmission summary to the user showing the results of the transaction instructions, including identifying which transactions were successfully processed, and which transaction instructions were not processed and the reason. The user may print the transmission summary if necessary. FIG. 17 illustrates a sample transmission summary 1700 following transaction instruction processing.

Email Messages

Figure 12:
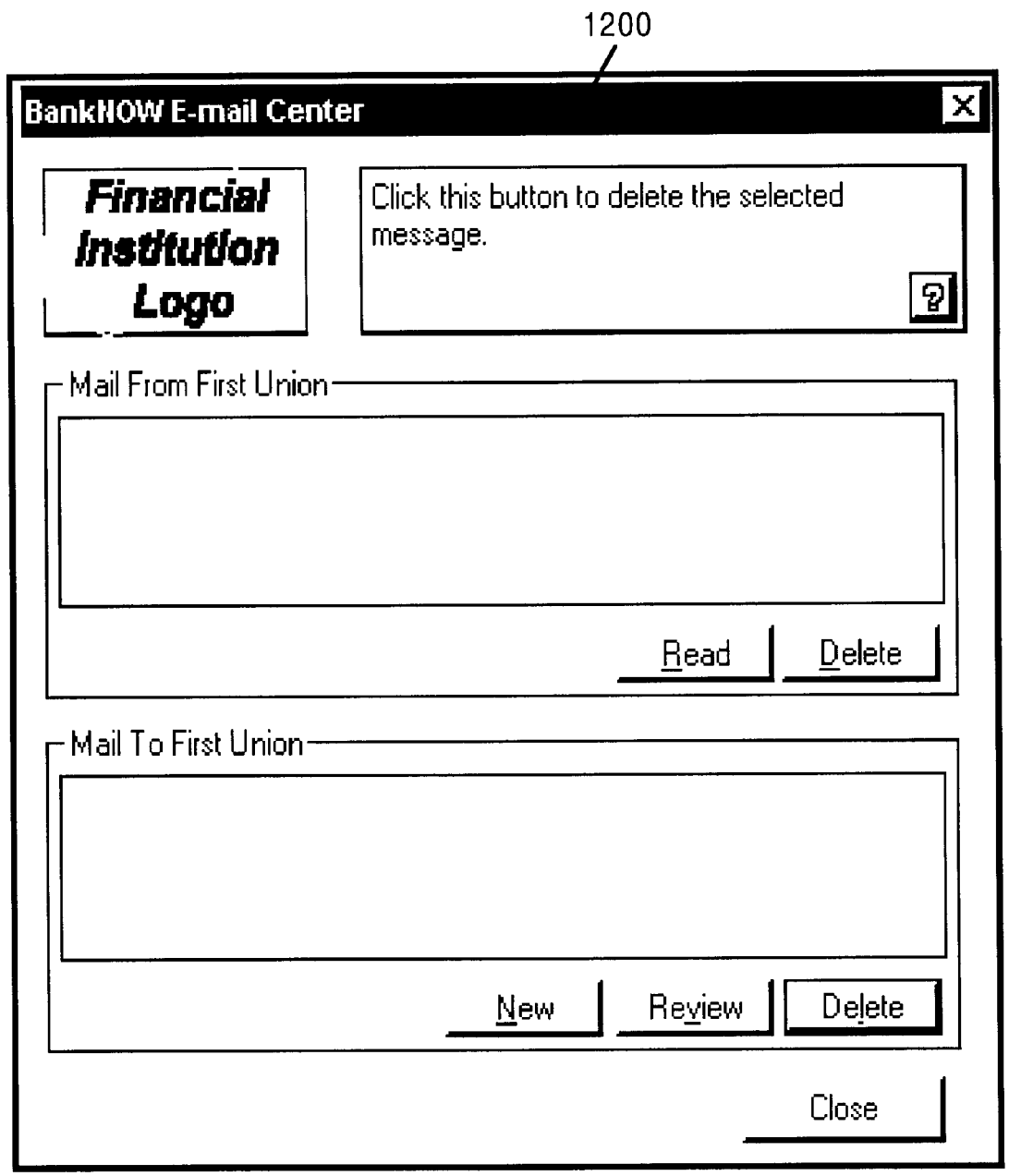
FIG. 12 is an illustration of a user interface for creating email messages.

In addition to payment of bills and other electronic transactions, the user interface of the present invention supports email based messaging from users to their financial institutions or others. Generally, email messages are for inquiries about specific transactions, such as errors in reported cleared transactions, when payments were made, and so forth. Messages to be sent from the user to a financial institution are created by clicking on the email button 192, which causes the display of an email messaging window 1200, such as illustrated in FIG. 12. The user can then create an email message by completion of the various fields of the window. Once completed, the message is placed in a data structure holding email messages to be sent; the mail box icon 192 is modified to show items in the mail box. Sent messages are not listed in the mini checkbook 181 since they are not transactions. In addition, the user may receive email messages from financial institutions, such as in response to inquiries, or general messages broadcasting information to users. Received messages are indicated by the mail box icon 192.

We claim:

1. A computer readable memory storing a computer program executable by a processor, for producing a user interface of an online banking system, the user interface comprising:

a first display area for listing a plurality of transaction instructions in a user selected account to be sent to a financial institution for processing, each transaction instruction including a description, and an amount;

a second display area, visually distinguished from and concurrently displayed with the first display area, for listing a plurality of uncleared transactions in the user selected account that have been sent to a financial institution as transaction instructions for processing, each uncleared transaction including a description and an amount;

an executable process that sends a transaction instruction in the first display area to a financial institution for processing, and removes the transaction instruction from the first display area and displays it in the second display area as an uncleared transaction;

a third display area, visually distinguished from and concurrently displayed with the first and second display areas, for listing a plurality of cleared transactions for the user selected account, each cleared transaction including a description and an amount, each uncleared transaction in the second display area being removed therefrom and listed in the third display area as a cleared transaction at a time subsequent to the transaction being cleared by a financial institution; and a first account balance for the cleared transactions in the user selected account, and a second account balance for both cleared and uncleared transactions in the user selected account, the first and second account balances updated in response to the transactions present in the second and third display areas, and concurrently displayed with the first, second, and third display areas.

2. The computer readable memory of claim 1, further comprising:

an executable process that receives from the financial institution a list of transactions cleared after a date of a last cleared transaction in the third display area, and removes from the list of uncleared transactions in the second display area any transaction that matches a transaction in the received list, and displays the matched transaction in the third display area.

3. The computer readable memory of claim 1, further comprising:

at least one executable process that receives from a user information defining a payment transaction, including information specifying a payee, an account, an amount, and a date by which the payment is to be made to the payee, and lists the payment transaction as a transaction instruction in the first display area.

4. The computer readable memory of claim 1, further comprising:

an executable process that receives from a user, information defining a transfer of funds between two user selected accounts, including a source account, a target account, and an amount.

5. The computer readable memory of claim 1, wherein the executable process operates in response to confirmation from the financial institution that the transaction instruction was received.

6. The computer readable memory of claim 5, wherein the executable process further causes the second account balance to be updated in response to the new uncleared transaction in the second display area.

7. The computer readable memory of claim 1, wherein each uncleared transaction and each processed transaction have a type, the type being one of a first group including an electronic debit, and electronic credit, a funds transfer, and a check.

8. A computer implemented method for integrating a plurality of diverse transactions into a single account of a user held by a financial institution, comprising:

storing a list of cleared transactions for the user's account;

storing a list of uncleared transactions for the user's account;

storing a list of transaction instructions to be processed by a financial institution;

sending a transaction instruction to a financial institution for processing, removing the transaction instruction from the list of transaction instructions, and storing the transaction in the list of uncleared transactions;

responsive to a signal indicating that a transaction sent to the financial institution has been processed, removing the processed transaction from the list of uncleared transactions, and storing the processed transaction in the list of cleared transactions;

displaying the lists of uncleared, unprocessed, and cleared transactions each in a visually distinguished display area, a first account balance for the list of cleared transactions, and a second account balance for both the list of cleared transactions and the list of uncleared transactions.

9. A computer implemented method for integrating a plurality of diverse transactions into a single account of a user held by a financial institution, comprising:

simultaneously displaying:
- a first visually distinguished list of transaction instructions to be processed by a financial institution;
- a second visually distinguished list of uncleared transactions for the user's account; and,
- a third visually distinguished list of cleared transactions for the user's account as of a known date;

sending a transaction instruction to a financial institution for processing, and removing the transaction instruction from the displayed first list of transactions, and displaying the transaction in the second list of uncleared transactions;

receiving from a financial institution a list of cleared transactions for a first date after the known date, and removing from the second list of uncleared transactions any transaction that matches a transaction in the received list, and displaying the transaction in the third list of cleared transactions; and displaying concurrently with the first, second, and third lists, a first account balance for the list of cleared transactions, and a second account balance for both the list of cleared transactions and the list of uncleared transactions.

10. A computer readable memory storing a computer program executable by a processor, for producing a user interface of an online banking system, the memory comprising:

program code means for creating a user interface comprising:
- first display area for listing a plurality of transaction instructions in a user selected account to be sent to a financial institution for processing, each transaction instruction including a description, and an amount;
- a second display area, visually distinguished from and concurrently displayed with the first display area, for listing a plurality of uncleared transactions in the user selected account that have been sent to a financial institution as transaction instructions for processing, each uncleared transaction including a description and an amount;
- a third display area, visually distinguished from and concurrently displayed with the first and second display areas, for listing a plurality of cleared transactions for the user selected account, each cleared transaction including a description and an amount, program code means for removing each uncleared transaction in the second display area and listing the removed transaction in the third display area as a cleared transaction at a time subsequent to the transaction being cleared by a financial institution; and program code means for sending a transaction instruction in the first display area to a financial institution for processing, removing the transaction instruction from the first display area and displaying it in the second display area as an uncleared transaction; and program code means for maintaining and displaying a first account balance for the cleared transactions in the user selected account, and a second account balance for both cleared and uncleared transactions in the user selected account.

11. A computer readable memory storing computer executable instructions for integrating a plurality of diverse transactions into a single account of a user held by a financial institution, the instructions executable by a processor for performing the operations comprising:

simultaneously displaying a first visually distinguished list of transaction instructions to be processed by a financial institution, a second visually distinguished list of uncleared transactions for the user's account; and a third visually distinguished list of cleared transactions for the user's account as of a known date;

sending a transaction instruction to a financial institution for processing, and removing the transaction instruction from the displayed first list of transactions, and displaying the transaction in the second list of uncleared transactions;

receiving from a financial institution a list of cleared transactions for a first date after the known date, and removing from the second list of uncleared transactions any transaction that matches a transaction in the received list, and displaying the transaction in the third list of cleared transactions; and displaying concurrently with the first, second, and third lists, a first account balance for the list of cleared transactions, and a second account balance for both the list of cleared transactions and the list of uncleared transactions.

* * * * *